June 17, 1952 W. B. KOCHNER 2,600,660
MANUALLY AND AUTOMATICALLY OPERATED VALVE
Filed Jan. 25, 1946 2 SHEETS—SHEET 1
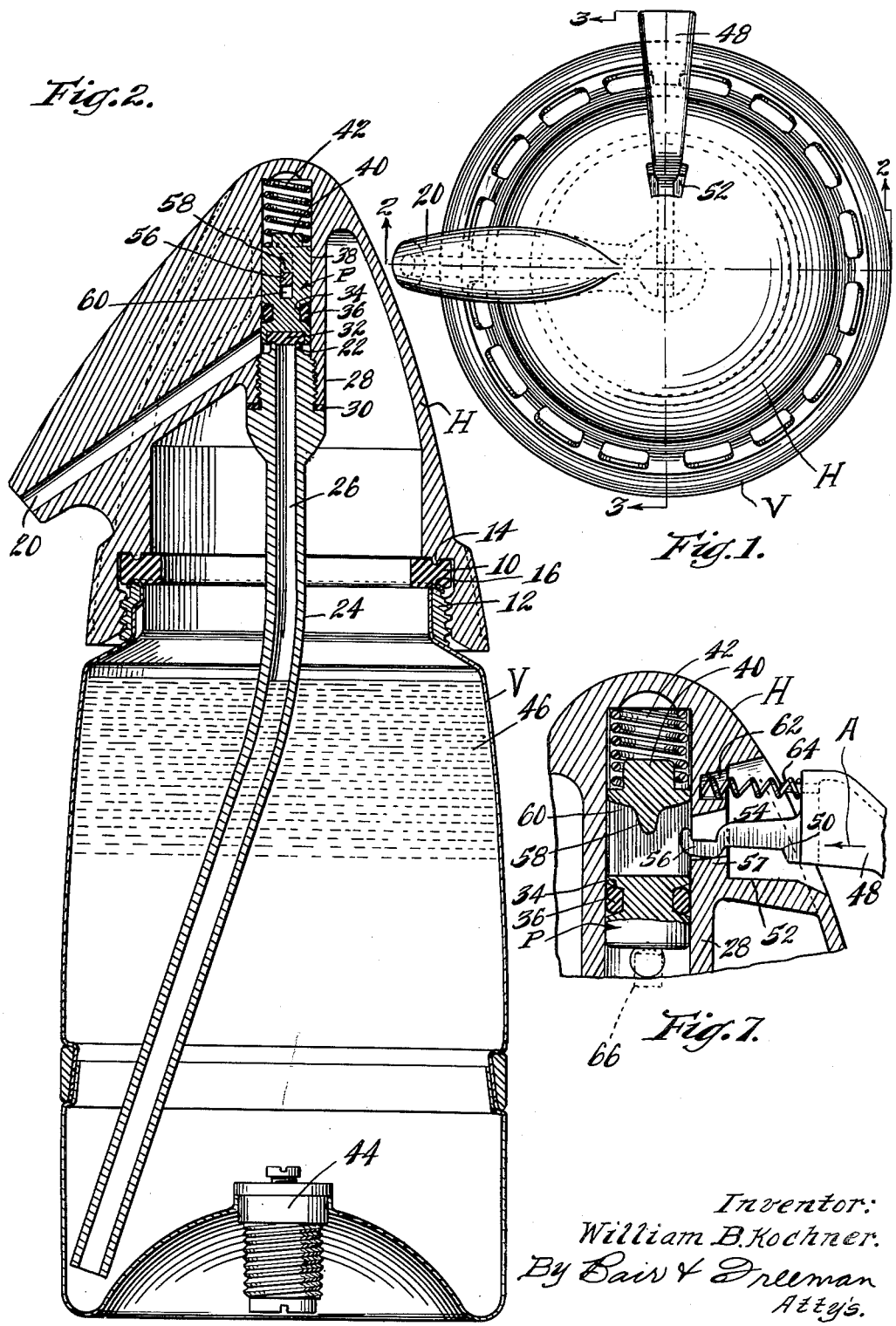
Inventor:
William B. Kochner.
By Bair & Freeman
Att'ys.

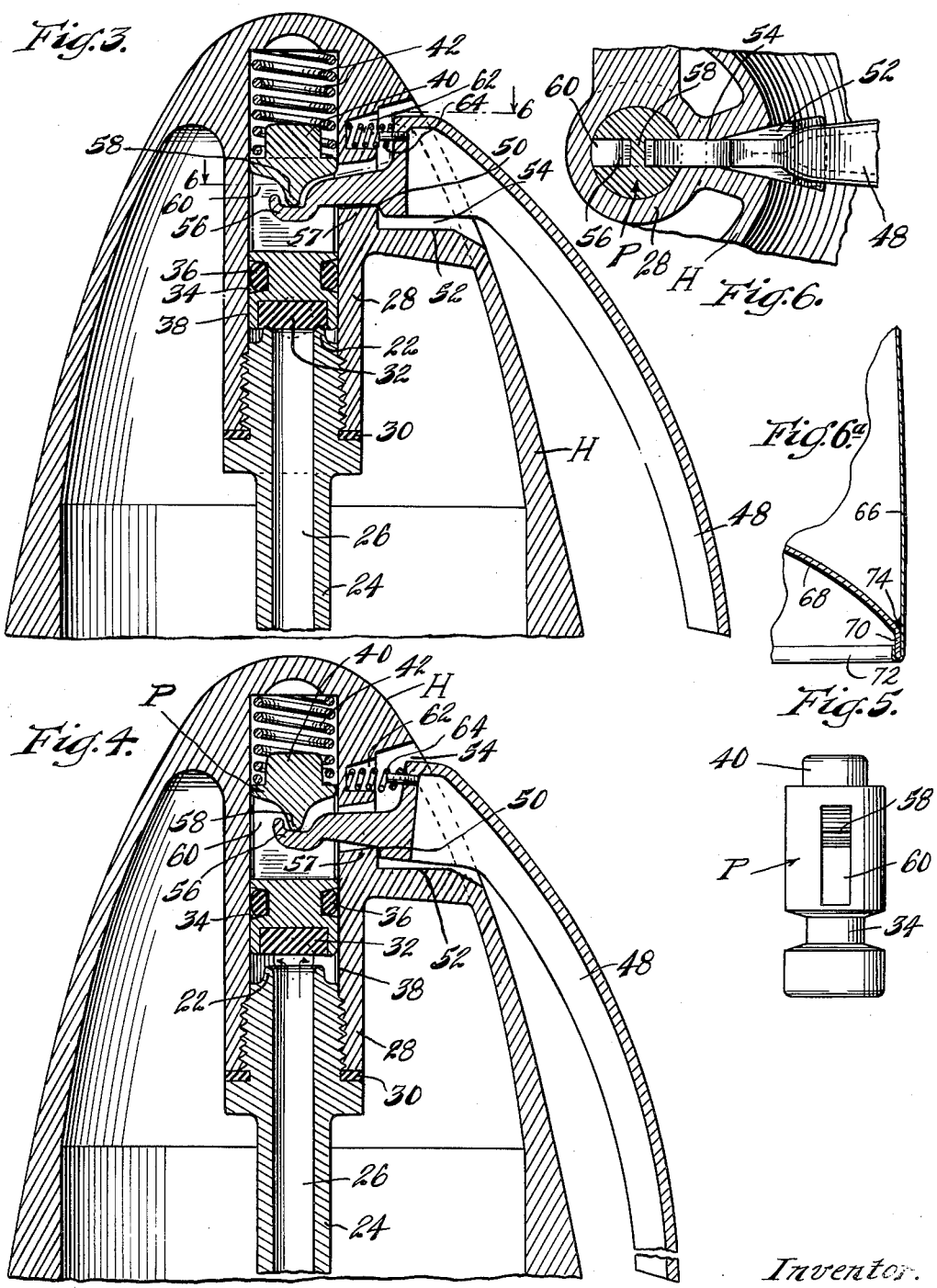

Patented June 17, 1952

2,600,660

UNITED STATES PATENT OFFICE 2,600,660

MANUALLY AND AUTOMATICALLY OPERATED VALVE

William B. Kochner, St. Louis, Mo., assignor, by mesne assignments, to Knapp-Monarch Company, St. Louis, Mo., a corporation of Delaware Application January 25, 1946, Serial No. 643,262

2 Claims. (Cl. 251—134)

My present invention relates to a syphon valve structure wherein the valve serves both as a safety valve and a manually manipulated means for discharging the contents of the syphon.

One object of the invention is to provide a single valve that serves the double purpose of pressure relief and manual release of the contents of the syphon thus eliminating the necessity of having two separate valves to accomplish these results.

Another object is to provide a pressure relief valve so constructed that a simple lever may be associated therewith to act as a manual means to open the valve when desired.

Still another object is to provide a valve plug normally seated by spring pressure against a valve seat that opens away from the interior of a syphon or aerating vase or the like with the spring exerting a predetermined load on the valve plug for safety pressure release.

A further object is to provide a manually operable lever for opening the valve which lever is readily associated with the valve during the assembling operation and held by the valve against accidental disassembly thereafter, the lever being of such design that the necessity of a pivot pin therefor is eliminated.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a syphon structure with my improved valve applied thereto.

Figure 2 is a vertical sectional view on the line 2—2 of Figure 1.

Figure 3 is an enlarged sectional view on the line 3—3 of Figure 1 and showing the valve closed.

Figure 4 is a similar sectional view showing the valve open.

Figure 5 is a side elevation of the valve plug itself as looking toward the left in Figure 4.

Figure 6 is a sectional view showing coaction between the lever and the valve plug.

Figure 6a is a sectional view similar to the lower left corner of Figure 2, showing a modified construction; and Figure 7 is a view similar to Figures 3 and 4 showing the position of the parts during assembly thereof.

On the accompanying drawings I have used the reference character V to indicate a vase and H a head thereon. The head H is adapted to screw onto the vase V with a gasket 10 between the two to prevent a leakage of pressure when they are screwed together. The vase V is made of sheet metal or the like and has a relatively heavy reinforcing ring 12 at its upper end threaded to coact with the threads of the head H. To facilitate screwing and unscrewing of the head relative to the vase, the head is provided with an annular bead 14 to gouge into the gasket 10 and the upper end of the vase is rounded in cross section as shown at 16.

The head H has a discharge passageway 20 which communicates with a valve seat 22 formed on the upper end of a syphon tube 24. The tube 24 has a bore 26 also communicating with the valve seat 22 and is threaded into a depending boss 28 of the head H with a suitable gasket 30 between the two.

Adapted for seating on the seat 22 is a valve plug P having a recessed lower end in which a sealing washer 32 is mounted and adapted to coact with the seat 22, as shown in Figure 3, when the valve is closed. The valve plug P has an annular groove 34 receiving a sealing ring 36 squeezed into position and adapted to seal against a bore 38 and the boss 28 in which the plug P is slidably and rotatably mounted.

The valve plug has a reduced upper end 40 entering a spring 42 which spring is interposed between the upper end of the valve plug and the upper end of the bore 38 of the boss 28. The valve spring 42 is of the proper strength to keep the valve plug seated on the seat 22 as long as normal pressures such as those produced by about 1½ Sparklet bulbs for a charge of $CO_2$ under high pressure is discharged into the vase V. The bottom of the vase is provided with a fitting 44 with which a holder for the bulb is associated for discharging the gas from the bulb into the vase V for the purpose of carbonating water 46 therein, or aerating any other liquid that might be introduced into the vase. Thus insurance is had against excessive pressures generated as by charging the syphon with two bulbs instead of one.

The valve plug P is also adapted to be opened manually at will by a lever 48 which has a shoulder 50 pivoting on an upward projection 57 from a bottom wall 52 of a lateral slot 54 in the head H. The lever 48 has a hook-like end 56 adapted to coact with a downwardly projecting cross piece 58 in a slot 60 of the valve plug P. The head H is provided with a spring socket 62 in which is mounted a relatively light spring 64 interposed between shoulders of the head and the lever 48, the bottom of the socket 62 constituting one shoulder and the upper end of the lever above the hook-like end 56 thereof constituting the other shoulder. The purpose of the spring 64 is to eliminate play and rattle of the lever 48.

The lever 48 is assembled relative to the valve plug P by pushing upwardly on the valve plug as by means of a pin 66, see Fig. 7, during assembly of the structure. The lever 48 may then be pushed inwardly as indicated by the arrow A and it will be noted there is clearance for the hook 56 to pass under the projection 58. After the lever is in position, as in Fig. 3, the pin 66 may be removed which will permit the spring 42 to engage the projection 58 with the hook 56, and the lever will thereafter be retained in position for the shoulder 50 to pivot on the projection 57 without the necessity of providing a pivot pin for the lever. The valve seat 22 with the syphon tube 24 attached is subsequently screwed into place and the parts will assume the positions illustrated in Fig. 3 and the device is ready for operation. If excessive pressure opens the valve, the parts will assume the position shown in Fig. 4, the spring 64 keeping the hook 56 in contact with the projection 58 and preventing any sloppiness of the handle 48 relative to the slot 54 in which it is mounted. In order to open the valve manually, the lever 48 may be depressed by engaging the palm of the hand therewith and moving it to the position of Fig. 4 which permits discharge of the contents of the liquid 46 from the vase V under control of the valve and as a result of pressure of the gas from the Sparklet bulb on top of the liquid.

From the foregoing disclosure it will be seen that I have provided a simple arrangement of valve structure that serves both as a pressure relief valve and a manually actuated valve. The parts are so arranged that a spring of predetermined strength can be utilized without the necessity of an adjustment therefor. The operating lever for the valve is readily assembled as shown in Fig. 7 without the necessity of any pivot pins, screws or the like and when once assembled will remain in assembled position due to the hook-like coaction between the parts 56 and 58 and to the projection 57.

In Fig. 6a I show a modified construction for the vase V instead of the form shown in Fig. 2. In the modification the vase consists of a side wall 66 of single-piece instead of double-piece construction, as in Fig. 2, and the bottom 68 of the vase then being a separate part having a flange 70 received in a return bent flange 72 on the lower edge of the side wall 66. The two are then united by means of pure tin solder, or other satisfactory material, shown at 74, so that greater strength is had than where the lower portion of the side wall and the bottom are formed as one piece (Fig. 2) with a large annular radius connecting them together for ease of cleaning. The modification in Fig. 6 makes for easier manufacturing, with interfitting of parts more readily maintained than in the design shown in Fig. 2. By using pure tin solder all toxic action resulting from bacterial growth is eliminated, the solder being arranged to form a fillet to prevent sharp corners or crevices which might collect bacteria.

Some change may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a syphon valve structure, a valve body having a bore and a discharge passageway from said bore, a valve seat communicating with said bore, a valve plug slidable in said bore and engageable with said valve seat, a spring for effecting such engagement and permitting the valve plug to be disengaged from said valve seat when excess pressure is delivered to said valve seat, and means to manually open said valve comprising a lever having a hook-like end to engage said valve plug and a shoulder at right angles to said end, said valve plug having a slot and a cross piece therein engageable by said hook-like end of said lever, said valve body having a slot extending laterally from said bore and adapted to receive said lever, said lateral slot having a shoulder therein, said lever pivoting against a side of said lateral slot, said hook-like end of said lever in engagement with said cross piece normally retaining said lever in position in said lateral slot and a relatively light spring between said two shoulders to retain said hook-like end in engagement with said cross piece.

2. In a syphon valve structure, a syphon head having a bore and a discharge passageway from said bore, a valve seat communicating with said bore, a valve plug slidable in said bore and engageable with said valve seat, a spring for effecting such engagement and permitting the valve plug to be disengaged from said valve seat by internal excess pressure, and means to manually open said valve comprising a lever, said valve plug having a slot and a cross piece therein engageable by one end of said lever, said head having a slot extending laterally from said bore and adapted to receive said lever, said lever pivoting against a side of said lateral slot, said lever and lateral slot having facing shoulders, and a spring between said facing shoulders to retain said lever end in engagement with said cross piece.

WILLIAM B. KOCHNER.

REFERENCES CITED

The following references are of record in the file of this patent:

UNITED STATES PATENTS

| Number | Name | Date |
|---|---|---|
| 429,121 | Enquist | June 3, 1890 |
| 585,165 | Stahl | June 22, 1897 |
| 619,216 | Philips | Feb. 7, 1899 |
| 787,449 | Idris | Apr. 18, 1905 |
| 1,037,680 | Spitzenberg | Sept. 3, 1912 |
| 1,644,265 | Noble | Oct. 4, 1927 |
| 1,689,961 | Patnaude | Oct. 30, 1928 |
| 2,351,376 | Ward | June 13, 1944 |
| 2,376,593 | Hellen | May 22, 1945 |